(12) United States Patent
Riddell et al.

(10) Patent No.: US 7,327,903 B2
(45) Date of Patent: Feb. 5, 2008

(54) METHOD AND APPARATUS FOR RECONSTRUCTION OF A MULTI-DIMENSIONAL IMAGE

(75) Inventors: Cyril Riddell, Paris (FR); Yves Trousset, Palaiseau (FR); Régis Vaillant, Villebon sur Yvette (FR); Jérémie Pescatore, Paris (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 764 days.

(21) Appl. No.: 10/860,725

(22) Filed: Jun. 3, 2004

(65) Prior Publication Data

US 2005/0047679 A1    Mar. 3, 2005

(30) Foreign Application Priority Data

Aug. 28, 2003   (FR)   ................................. 03 10252

(51) Int. Cl.
*G06K 9/32* (2006.01)
*G06K 9/00* (2006.01)
*G06K 9/36* (2006.01)

(52) U.S. Cl. ........................ 382/298; 382/154; 382/276

(58) Field of Classification Search ................ 382/298, 382/154, 276, 285, 293, 294, 295, 296; 345/419, 345/420, 660–671; 348/561; 708/208
See application file for complete search history.

(56) References Cited

U.S. PATENT DOCUMENTS 6,320,928 B1   11/2001   Vaillant et al.
6,757,445 B1 *  6/2004   Knopp ........................ 382/285
6,915,072 B2 *  7/2005   Takahashi et al. ........... 396/296

FOREIGN PATENT DOCUMENTS

WO    WO 98 10378 A    3/1998

OTHER PUBLICATIONS

Riddell et al, Variable Scale Reprojection for Iterative Reconstruction Application to PET REconstruction with OSEM, Proc. IEEE Nuclear Symp. and Medical Image Conf., M12-001, Seattle, 1999.
Whale et al., Image preprocessing for 3-D reconstruction from biplane angiograms, Engineering in Medicine and Biology Society, 1996, 18th Annual International Conference of the IEEE, Amsterdam, Netherlands, Oct. 31-Nov. 3, 1996, pp. 654-655.

\* cited by examiner

*Primary Examiner*—Yon J. Couso
(74) *Attorney, Agent, or Firm*—Cantor Colburn LLP

(57) ABSTRACT

A method and apparatus for imaging including reconstruction of an image of an object from a set of projections acquired for different positions of an acquisition apparatus around the object to be imaged and in which a projection source is situated at a finite distance relative to the acquisition apparatus. The method includes undertaking a set of rectifications of projections acquired for different positions of the acquisition apparatus, rectifications comprising transforming the data of the projection acquired projection into projection data on a virtual rectification support placed in a preset orientation in concordance with a set of reconstruction calculation points distributed over the image to be reconstructed.

70 Claims, 4 Drawing Sheets

METHOD AND APPARATUS FOR RECONSTRUCTION OF A MULTI-DIMENSIONAL IMAGE

CROSS-REFERENCE TO RELATED APPLICATIONS

This application claims the benefit of a priority under 35 USC 119(a)-(d) to French Patent Application No. 03 10252 filed Aug. 28, 2003, the entire contents of which are hereby incorporated by reference.

BACKGROUND OF THE INVENTION

The present invention relates to a method and apparatus for reconstruction of a multi-dimensional image. In particular, the present invention is directed to image reconstruction of a bi-dimensional or three-dimensional image of an object, for example part of the body of a patient, from a set of projections respectively mono-dimensional or bi-dimensional of this object, obtained for different positions of apparatus for viewing around the object. The invention particularly relates to medical imagery by tomographic reconstruction.

Tomography produces images of slices of an object by acquiring measurements integrated along lines, a measure of a physical parameter of the object using a detector that revolves around the object over at least 180° (with additional treatment more restricted angular ranges can be adopted). The slices are reconstructed by calculation typically as planes orthogonal to the axis of rotation (oscillations of the axis of rotation from one angle of projection to the other are tolerated).

The result is an image of the distribution of the physical characteristic of this object, a characteristic such as the attenuation coefficient for tomography calculated from X-rays and CT imaging, or such as radioactivity for emission tomography, or such as trajectories found in rotational angiography.

Such reconstruction operations utilize substantial computer processing, especially in the form of projections (transformations from a dimension space d to a dimension space d-1) and in the form of filter- or back-projections (transformation from a dimension space d-1 to a dimension space d).

Three types of reconstruction are known, which correspond to three different acquisition geometries. Reconstruction geometry defines the relation between a source of a measuring line forming the object of an integral, with a set of measuring points. In a first geometry, known as parallel-beam geometry, the source is considered as being at an infinite distance from the detector and all the measuring lines have the same direction, given by the angle of projection. In a second geometry, known as fan-beam geometry, the source is at a finite distance from the detector, called a focal distance and all the measuring lines define a fan diverging in a plane, a plane intercepted by a linear detector. The direction of the optical axis is defined by the line which is orthogonal to the detector and which passes through the source. This direction is defined by the angle of projection. A third geometry, known as cone-beam geometry, is a generalisation of the fan-beam geometry, in which the measuring lines define a cone in three dimensions, a cone departing from the source and intercepted by a detector in two dimensions, that is, by a detection surface.

In these three geometries, tomographic reconstruction requires heavy calculation, e.g., computer-intensive mapping, to transform the set of measurements made at different angles (oblique measurements) in reconstructed data which have to be calculated in a set of reconstruction points distributed in a predetermined manner on the object to be reconstructed. This problem of the importance of the calculation is also posed when it is a question of moving from an interim reconstructed object to projections of this reconstruction on virtual oblique detector positions, particularly in the scope of reconstructions by iteration which imply a succession of such projections then reconstructions with comparison of the virtual projections and the real projections at each iteration.

Within the scope of the geometry cone-beam geometry, the slices are not generally constructed from independent sinograms, but are reconstructed from the same set of surfaces of surface measurements. The reconstruction is considered 3D and the cost in calculating between the volume reconstructed in 3D and the surface measurements is even higher.

To rectify this problem, a known method comprises re-sampling the reconstructed object to align the set of reconstruction points successively with each successive direction of oblique detector. All the same, the re-sampling at each angle of projection is an equally costly in calculation.

Within the scope of projection with parallel-beam geometry, a technique for facilitating the task of treatment is also known as will be described with respect to FIG. 1.

BRIEF DESCRIPTION OF THE INVENTION

An embodiment of the invention is a method of image reconstruction that enables the computational intensity of the calculation to be reduced and also for the geometries at a finite focal distance.

An embodiment of the invention is a method of imaging including reconstruction of an image of an object from a set of projections acquired for different positions of an acquisition apparatus around an object to be imaged and in which a source of projection is situated at a finite distance relative to the acquisition apparatus. A embodiment of the invention comprises creating a set of rectifications of projections acquired for different positions of the acquisition apparatus and rectifications comprising transforming the data of the projection in question into projection data on a virtual rectification support placed in a preset orientation in concordance with a set of reconstruction calculation points distributed on the image to be reconstructed.

An embodiment of the present invention is apparatus for image reconstruction comprising an acquisition apparatus provided for acquiring projections for different positions of this acquisition apparatus around an object, a source generating these projections and placed at a finite distance from the acquisition apparatus, means for processing data capable of determining an image value reconstructed in a series of points distributed over the image, means for processing providing the creation of a set of rectifications of acquired projections, each rectification comprising transforming the data of the projection in question into projection on data on a virtual rectification support, and a rectification support positioned according to a preset orientation in concordance with the distribution of the calculation points of the image value.

DESCRIPTION OF THE DRAWINGS

An embodiment of the invention will be better understood from the following detailed description, made with reference to the attached figures, in which.

DETAILED DESCRIPTION OF THE INVENTION

Figure 1:
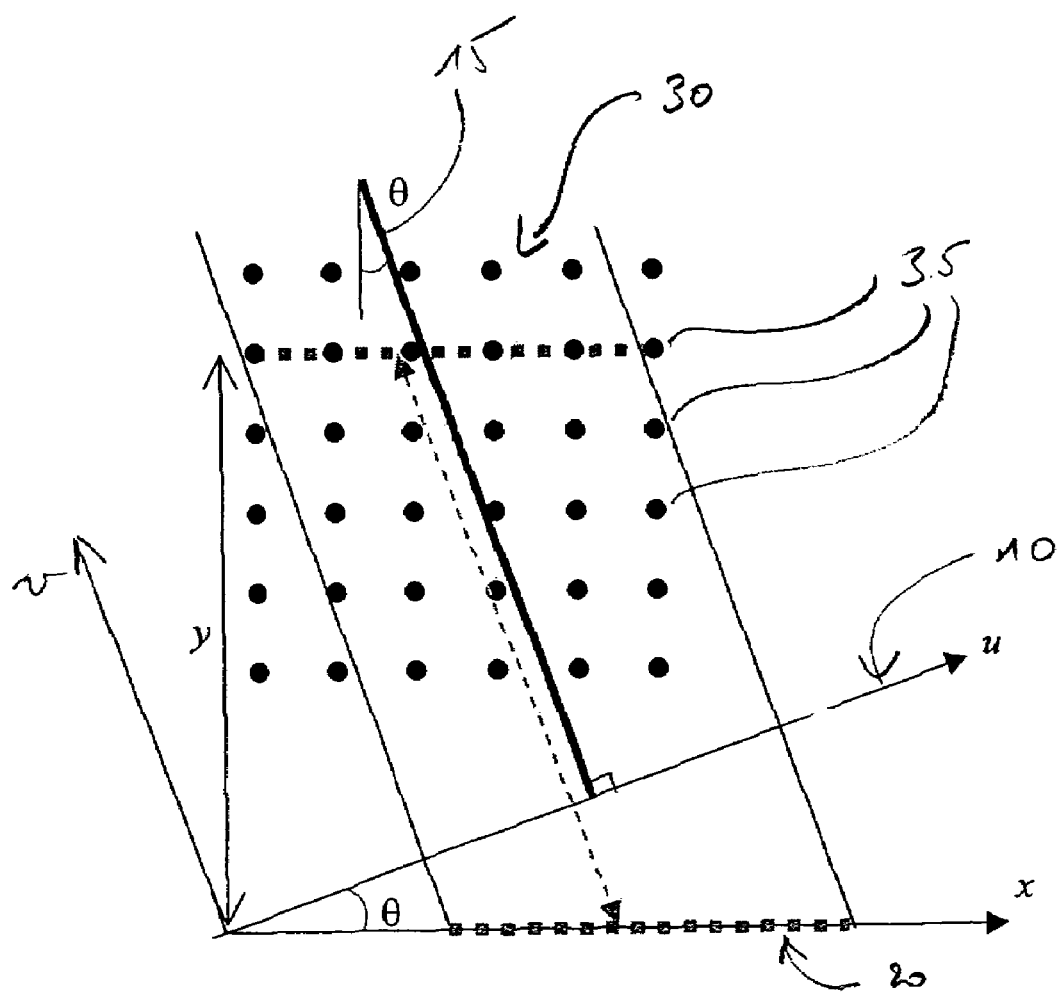
FIG. 1 illustrates a known reconstruction method applicable to parallel beam geometry.

FIG. 1 illustrates a known reconstruction method applicable to parallel beam geometry where each acquisition of an oblique detector 10 could be transformed into data for acquiring a virtual sensor 20 and positioned, on an axis x selected so as to be rectified parallel to the distribution of reconstruction points 35 distributed in a matrix on the object 30 to be reconstructed. This rectification supplies virtual acquisitions positioned on the same fixed axis x, which subsequently prove exploitable by utilizing simple translations and summations. The passage between the reconstructed object 30 and such projections on a selected axis, as well as the inverse passage, require only summations and translations as the rectified projections are mathematically connected to each spread of reconstruction points 35 by simple translation in the parallel beams with summation of the effects on the fixed axis x. The operations of rotation calculation of the acquisition apparatus are thus cancelled ab initio, eliminating the difficulty of calculation and benefiting from the advantages of the parallel-beam geometry that makes the calculation particularly simple during so-called reconstruction of the object. All the same, the problem of the intensity of the calculation remains within the scope of the acquisition geometries at a finite focal distance (fan-beam and cone-beam), where the advantages of a parallel-beam are lost.

The known theoretical considerations that are the basis for rectifications applicable to parallel-beam are, a follows. Consider a system of fixed coordinates (O, x, y) in the plane of an image to be reconstructed and a rotating marker (O, u, v) such as: u=x cos θ−y sin θ where θ is the projection angle. An object to be reconstructed is defined by a bi-dimensional function f (x, y) that describes the physical characteristics of the object. The parallel projection at the angle θ is defined as being the integration of the function f along the vector v, that is, the value f of x, y added to the measuring axis of the abscissa:

$$u = x \cos\theta - y \sin\theta. \quad (1)$$

The back-projection operation is the transposed operation of the summation (integration) on the axis of the abscissa given by equation (1), allowing the reversion to the value of the coordinates (x, y) function. Since tomographic acquisition is comprises a series of rectilinear integrals of f along the lines v, this acquisition is exploited for a variant u ∈]−∞, ∞[ and for θ varying over at least 180°.

Equation (1) shows that the projection parallel to the angle θ is equivalent to re-sampling the function F (x, y) into the (O, u, v) coordinate system and not on reconstruction meshing such as illustrated in FIG. 1, and aligned to the axes x and y, but on meshing obtained in the marker (O, u, v), that is, by rotation of the object by the angle θ, then by calculation of the integral along the direction v.

An angle of projection θ such as |tan θ|≦1 is to be considered. Equation (1) is then equivalent to:

$$u = \frac{x - y\tan\theta}{1/\cos\theta}. \quad (2)$$

Equation (1) describes part of a rotation is therefore equivalent to Equation (2) which comprises a translation (by y tan θ) followed by a change of scale in magnification (change of scale by cos θ). The factor defining the translation depends on the coordinate y, whereas the factor defining the magnification depends solely on the angle of projection θ.

Therefore, the parallel projection of the image can be decomposed into a succession of translations along the axis x (a range of reconstruction points located on the coordinate y is thus translated from the value y tan θ), an operation followed by a sum along the axis y and final magnification along the axis x.

In the framework of an iterative method, such simplified projection is especially used when it involves creating projection of an object which is already reconstructed, that is, an object 30 whereof a first estimation of the values at different points calculation 35 are known.

In the same way, based on the knowledge of these projections on the axis x, back-projection, with a view to making use of a first estimation of the values f at the points of calculation 35, or with a view to re-evaluating these values, is produced simply by resorting to the transposed transformations of the series of simple operations comprising previously specified translations, magnifications and summations.

Therefore the set of these calculations is simplified and easily optimized, particularly by the fact that the summation and translation operations are optimizable both from the software point of view and from the point of view of the processing equipment (hardware). Hence, the calculations can be implemented or optimized by either hardware or software.

Figure 2:
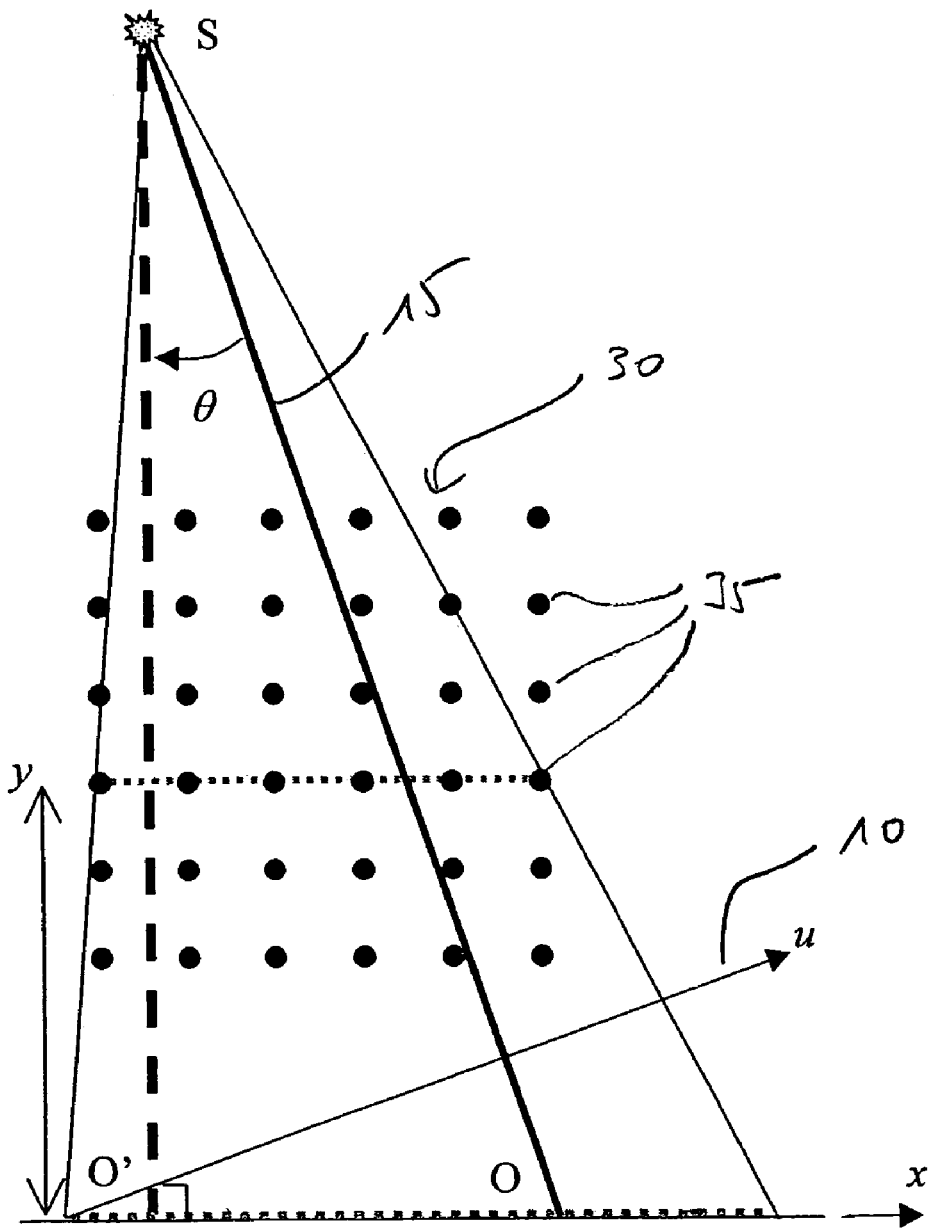
FIG. 2 illustrates a reconstruction method according to an embodiment of the present invention applicable to acquisition geometry with a fan-beam.

FIG. 2, this time using a fan-beam projection, the geometrical link which exists between a sensor position 10 oblique to the angle θ and a fixed axis x aligned to the distribution of the ranges of reconstruction points 35 distributed over the object 30 to be reconstructed It is seen that distribution of the calculation points 35 is selected here by means for processing utilizing the reconstruction calculations.

With a source S placed this time at a finite focal distance, projection on the axis x, even though it is equivalent in terms of measurement acquisition with projection on the sensor 10, requires geometric transformation slightly different to that shown for parallel beams.

After obtaining such a projection on the axis x whereof the modalities will be described hereinbelow, its exploitation, that is, the realization of back-projections (and projections in the case of an iterative application) is no longer limited to a series of translations and summations, due to the fact of non-parallelism of the beams in question.

All the same, the result that the approach comprising redistributing the acquisitions obtained from the positions of oblique sensors 10 towards a reference frame aligned with the ranges of points 35 making up the object 30 is also desirable in the case of such acquisition at a finite focal distance.

In effect, once the acquisitions on oblique sensors 10 are redistributed on an axis x parallel to the range of points of the object, the calculations of projections and back-projections prove not to be limited to translations and summations, but to summations and homothetic transformations, that is, summations, translations and magnifications.

Simplification of the reconstruction calculations is thus obtained after previous rectification. Further, rectification itself comprises an operation accessible by calculation, with reduced processing costs.

Rectification on the axis x makes use of a variable magnification factor, and especially one which varies along the acquisition segment materialised by the oblique sensor. All the same, this rectification is homographic, an operation which can be carried out in linear calculation. Therefore, rectification, even though more complex than in parallel-beam geometry, nonetheless proves that it can be carried out by multiplication by a simple matrix, a matrix where the coefficients are further established by simple trigonometric relations.

An example of such a rectification is as follows. Therefore, rectification is also advantageous in the scope of geometries with finite focal distance, by considering the processing carried out in the form of simple geometric relations comprising decomposing transformations in the form of homographics.

Projections on the rectification support, here axis x, are otherwise decomposed in a series of translations along an axis and summations along the other axis. The final projection can be obtained in this approach by compression of the rectified projection in an oblique projection (down-sampling) by a factor between 1 (when $\theta=k\pi/2$, k being a signed integer, for example, a negative whole number) and $\sqrt{2}$ (when $|\tan \theta|=1$).

For back-projection of the tomographic data, the initial data obtained on an oblique sensor are for example magnified (and thus up-sampled) by a factor between 1 (when $\theta=k\pi/2$, k is a signed integer, for example, a positive or negative whole number) and $\sqrt{2}$ (when $|\tan \theta|=1$). The magnified profile is thus triggered and added for each range of the reconstruction grille.

With reference to FIG. 2, projection of the bundle on an oblique axis u can be considered as equivalent to projection on the horizontal axis parallel to the axis x from the same source S.

The optical axis is no longer an axis 15 perpendicular to the sensor, that is, in the direction v, but is an axis perpendicular to x, and passing through S, which is qualified as a rectified optical axis. The magnification ratio existing between each range of reconstruction points and the rectified axis is a ratio which depends on the focal distance, the position y of the range in question and the position at x of the rectified optical axis.

It is noted that rectification is followed by homographic re-sampling of this axis u towards the rectified axis x.

Each support of rectification parallel to the horizontal axis x is a valid rectification axis as it enables rectified data on the latter to be passed to data of the reconstructed object. It eventuates all the same that different rectification supports, although parallel, will not give rise to the same magnification.

According to the choice of such a rectification support, homographic rectification transformation is likely to comprise over-sampling and/or under-sampling relative to the oblique measuring profile, with significant factors of over- or under-sampling. In order to avoid such factors, preferred rectification comprises adopting, in the position of a given sensor, a rectification support arranged to correspond with the position of the sensor.

Figure 3:
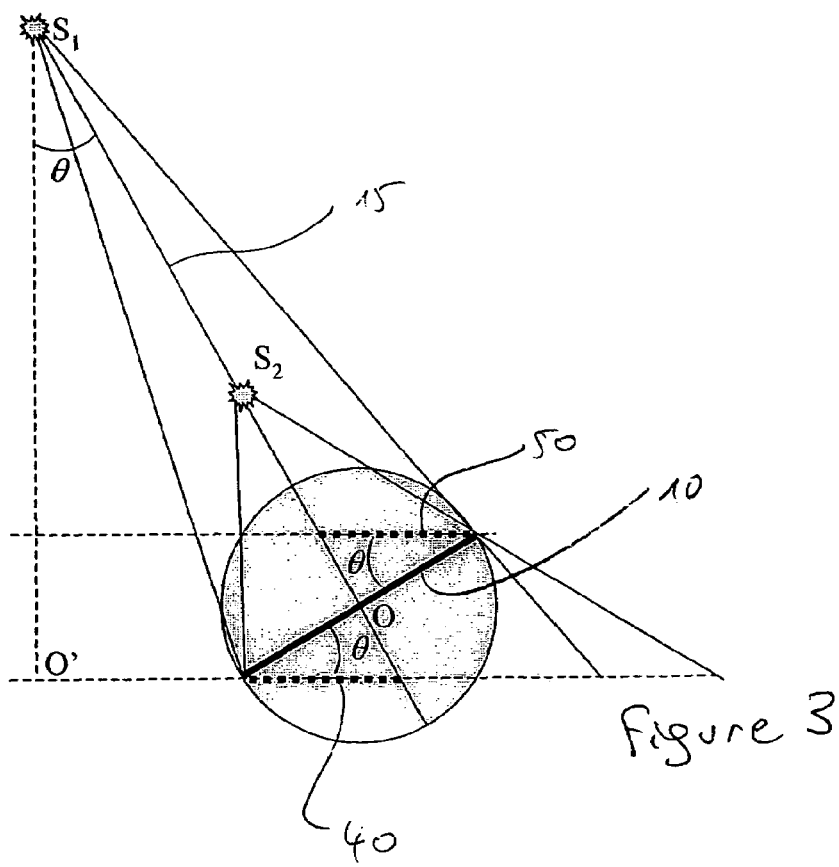
FIG. 3 illustrates a reconstruction method according to an embodiment of the present invention utilizing a different rectification positioning support according to the position of the acquisition apparatus.

Therefore, and more precisely with respect to FIG. 3, rectification and corresponding re-sampling are carried out preferentially, in the case of a flat detector 10 and of finite dimensions, on two segments of rectification supports 40 and 50 situated respectively at the two ends of the oblique position in question of the sensor 10, and covering the two parts of this sensor separated by the optical axis 15 of the latter.

Accordingly, each portion of rectification 40 and 50 extends parallel to the axis x and on or under the sensor 10 according to which the portion is located on one side or the other of the optical axis 15. These portions 40 and 50 each form the hypotenuse of a rectangle triangle respectively whereof the two perpendicular sides are respectively a half of the sensor 10 and a portion of the optical axis 15 arriving at the sensor 10. Each half sensor 10 is rectified on the portion of axis 40 or 50 of rectification support of direction x which corresponds to it, that is, that which cuts the sensor 10 at its outer end in question.

By so doing, homographic transformation from the oblique sensor 10 always comprises under-sampling when a projection is utilized and over-sampling when back-projection is utilized by a factor that varies between 1 (when $\theta=k\pi/2$, k is a positive or negative whole number) and a maximum value of $\sqrt{2}$ (when $|\tan \theta|=1$).

In effect, the proximity of the rectification support relative to the sensor 10 and to the object 30, and separation into two rectification semi-supports 40 and 50, enables limiting of the over/under-sampling being utilized.

Figure 4:
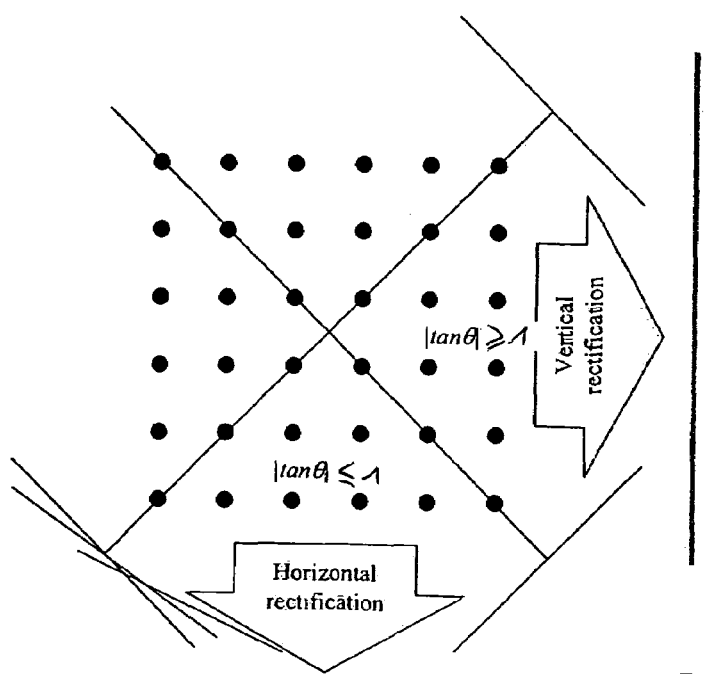
FIG. 4 illustrates a rectification method utilizing two different rectification orientations, as a function of the position of the acquisition apparatus.

Further, as shown geometrically in FIG. 4, the rectification stage and the corresponding re-sampling are independent of the focal distance. In effect, FIG. 3 shows two sources S1 and S2, and the corresponding rectified support portions 40, 50, portions that are unchanged, irrespective of the source S1 or S2 in question, provided that the orientation of the optical axis 15 remains the same.

As will now be described, the limitation of the factors of over- or under-sampling is also reinforced as two different directions of rectification are used, directions which are opted for as a function of the value of the angle of projection $\theta$, that is, of the position of the sensor 14.

Therefore, rectification is done according to the direction x or the direction y according to which the sensor is directed more closely with the direction x or with the direction y.

FIG. 4 illustrates the choice of the direction of rectification adapted as a function of the value of the angle $\theta$. For an angle $\theta$ such as $|\tan \theta/ \leq 1$, rectification following the direction of the axis y is used, while for the values of $\theta$ such as $|\tan \theta/ \leq 1$, it is the direction x which is adopted.

The final result is re sampling by rectification that depends on the angle of projection. In this way, the magnification factors are reduced to values less than $\sqrt{2}$, particularly when this distribution in two directions is combined with the variable support configuration as described previously, with this configuration with support close to the sensor being oriented according to x or y as a function of the optical angle $\theta$.

These re-sampled projections are equivalent tomographic measurements, from which operations of projection and back-projection, and thus of tomographic reconstruction (analytical or iterative), can be decomposed in a succession of processing stages at a dimension comprising magnifications, translations and summations.

Such re-sampling by rectification as a function of the angle of projection also proves applicable for a conical geometry in three dimensions, i.e., cone-beam geometry. The reconstruction method in cone-beam acquisition geometry reveals the result, according to which for a given source position, all the detection surfaces which cut the cone and define the same solid detection angle constitute equivalent tomographic measurements, and re-sampling from one detection surface to another equivalent surface leads to reconstruction of the same object, in terms of calculation costs if this surface is properly oriented.

The above described method is especially adapted for tomographic reconstruction making use of filtering and back-projections of the projected data. This method is applicable iterative reconstruction or where the reconstructed volume is estimated by iterations including each projection and back-projection. In iterative reconstruction, comparison of the data acquired by initial projections with projections of the object estimated on the iteration in question back-projects the stated spread to refine the estimation of the object.

Rectification of the data acquired on an oblique sensor re-samples the tomographic data on rectified projections, which is done once only prior to utilizing such facilitated iterative reconstruction.

Within the scope of flat projection at finite focal a distance in a three-dimensional space, this re-sampling of data from a detection surface to another surface also proves to be a homographic transformation that is linear in homogeneous coordinates.

In the case of acquisition geometry with conical beam geometry in three dimensions, the method described hereinabove is generalized particularly from the elements to be described as follows. The reconstruction volume can, in the conical case, be considered as stacking slices perpendicular to a predefined axis z. This axis z is defined as being the axis orthogonal to the plane images that would be obtained with parallel-fan beam or cone-beam geometry.

The angle of projection is defined as being the angle of the optical axis of the conical beam in the plane (O, x, y). Rectification is done in the marker (O, x, y, z) in the same way as for the case of cone-beam geometry, with this rectification all the same being rectification of planes rather than rectification of axes. Therefore, a rectified plane is selected which is parallel to the axis x or the axis y, the axes x and y again being selected in reference to the distribution of the calculation points of reconstruction on the object to be reconstructed. Additionally, the detection plane can also be rectified so as to be made parallel to the axis z.

Figure 5:
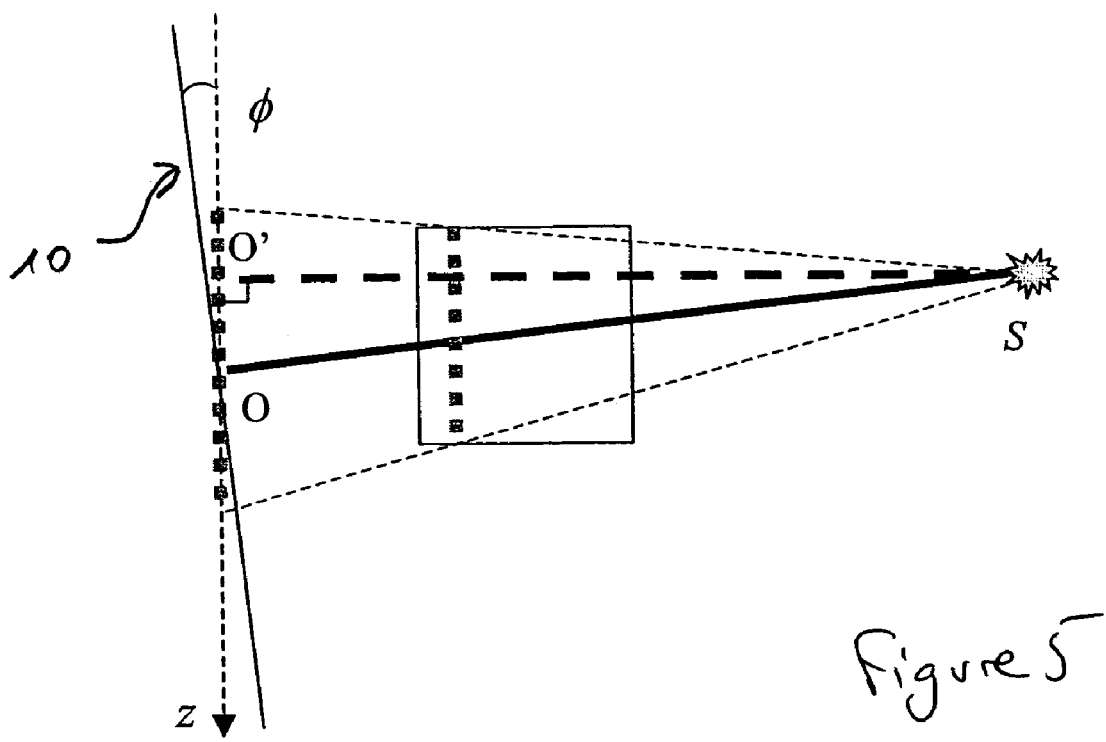
FIG. 5 illustrates a rectification according to a supplementary orientation, applicable to acquisition geometry with a cone-beam.

FIG. 5 illustrates rectification put into use in reference to an axis z, which follows the same principle as rectification implemented such as explained earlier in reference to the geometry with cone-beam geometry. For the majority of the acquisition orbits adopted within the scope of a geometry with a conical beam, the angle $\Phi$ measured between the axis z and the vertical axis of the sensor 10 is an angle which can be considered as zero or small (for example, the vascular observation with a C shaft, Scanner CT). In the majority of cases, this angle is such that $|\tan \Phi| \leq 1$.

All the same, for certain special orbits which are capable of present wider angles in reference to the axis z, alignment simultaneously along the axes x or y rather than with the axis x becomes desirable.

It will be noted that rectification in reference to the axis z, such as shown in FIG. 5, can also be applied within the scope of parallel geometry in 3D, such as seen in 3D positron omission tomography (the focal distance is then infinite). In this case rectification in reference to the axis z follows the same principle as rectification with parallel in 2D. This type of rectification is also applicable to arbitrary tomographic orbits in geometry with conical beam.

Figure 6:
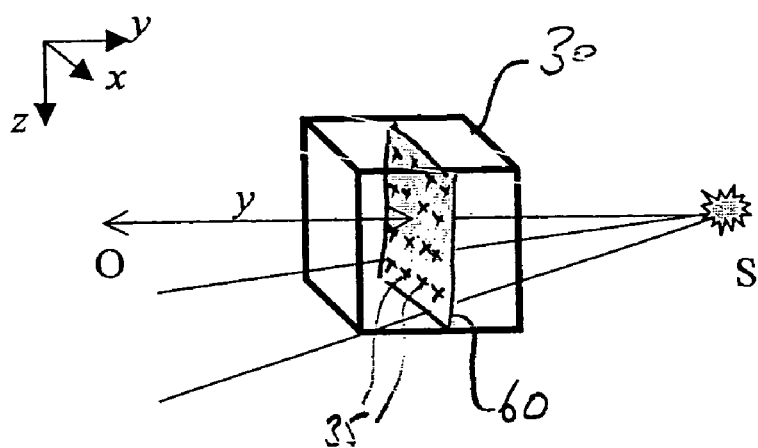
FIG. 6 diagrammatically illustrates distribution of rectification supports applicable to acquisition geometry with a cone-beam.

FIG. 6, which illustrates in perspective rectification in 3D imagery, shows that each section 60 of the volume 30 to be reconstructed, that is, each set 35 of points parallel to the rectified plane, is connected to this plane by projection and magnification in two dimensions, followed by summation. The parameters of such magnification are the focal distance and the distances x, y and z defining the position of the rectified optical axis in question. This involves an extension of the analysis undertaken in 2D, i.e., fan-beam, for cone-beam geometry. The stages of magnification and summation in two dimensions are themselves separable, that is, realized on series of vectors in one dimension that are processed along lines and columns of the volume in question.

In an iterative method, the operations of projection and back-projection are decomposed in a succession of translations and summations in 2D, which are each separable in treatments in one dimension along each direction of the rectified plane.

The different embodiments described hereinabove thus enable, by rectification of the series of acquired data, to decompose the reconstruction operations, until now very costly in calculation, to a succession of magnifications, translations and summations of vectors, thus utilizing a flow of data which is easier to work with, where the results are better to predict, and where the processing is easier to optimize as much by software means as for hardware means. Such rectification is also provided within the scope of detectors having a form other than rectilinear, while retaining the same advantages.

This technique, which especially relates to tomographic reconstruction, can be applied, for example, to circular sensor geometries such as can be found in positron emission tomography, single photon emission computer-assisted tomography, or X-ray CT imaging, as well as in techniques containing irregular trajectories, such as for example in rotational angiography.

One skilled in the art may make or propose various modifications in structure/way and/or function and/or result and/or steps of the disclosed embodiments and equivalents thereof without departing from the scope and extant of the invention.

What is claimed is:

1. A method of imaging comprising:
   acquiring a set of projections acquired for different positions of projection source that is situated a finite distance;
   undertaking a set of rectifications of the projections, the rectifications comprising transforming data of the acquired projections into projection data on a virtual rectification support placed in a preset orientation in concordance with a set of reconstruction calculation points distributed over an image to be reconstructed; and
   reconstructing the image from the rectified set of projections.

2. The method according to claim 1 wherein the rectification support or supports are positioned parallel to ranges or columns of a matrix of points for reconstruction calculation extending onto the image of an object to be reconstructed.

3. The method according to claim 1 wherein each rectification operation comprises a homography to the rectification support, as well as re-sampling on this rectification support.

4. The method according to claim 2 wherein each rectification operation comprises a homography to the rectification support, as well as re-sampling on this rectification support.

5. The method according to claim 1 comprising an iterative method where each iteration includes a projection and back-projection between the object to be reconstructed and the rectification support(s).

6. The method according to claim 2 comprising an iterative method where each iteration includes a projection and back-projection between the object to be reconstructed and the rectification support(s).

7. The method according to claim 3 comprising an iterative method where each iteration includes a projection and back-projection between the object to be reconstructed and the rectification support(s).

8. The method according to claim 4 comprising an iterative method where each iteration includes a projection and back-projection between the object to be reconstructed and the rectification support(s).

9. The method according to claim 5 wherein each iteration comprises a comparison between reconstructed data at a preceding iteration and rectified data.

10. The method according to claim 6 wherein each iteration comprises a comparison between reconstructed data at a preceding iteration and rectified data.

11. The method according to claim 7 wherein each iteration comprises a comparison between reconstructed data at a preceding iteration and rectified data.

12. The method according to claim 8 wherein each iteration comprises a comparison between reconstructed data at a preceding iteration and rectified data.

13. The method according to claim 1 comprising using projections or back-projections between rectified data and the reconstructed object, projections or back-projections each of which utilizes a magnification factor which depends on the angle of orientation of an acquisition apparatus in the position giving rise to the rectified data.

14. The method according to claim 2 comprising using projections or back-projections between rectified data and the reconstructed object, projections or back-projections each of which utilizes a magnification factor which depends on the angle of orientation of an acquisition apparatus in the position giving rise to the rectified data.

15. The method according to claim 3 comprising using projections or back-projections between rectified data and the reconstructed object, projections or back-projections each of which utilizes a magnification factor which depends on the angle of orientation of an acquisition apparatus in the position giving rise to the rectified data.

16. The method according to claim 4 comprising using projections or back-projections between rectified data and the reconstructed object, projections or back-projections each of which utilizes a magnification factor which depends on the angle of orientation of an acquisition apparatus in the position giving rise to the rectified data.

17. The method according to claim 5 comprising using projections or back-projections between rectified data and the reconstructed object, projections or back-projections each of which utilizes a magnification factor which depends on the angle of orientation of an acquisition apparatus in the position giving rise to the rectified data.

18. The method according to claim 6 comprising using projections or back-projections between rectified data and the reconstructed object, projections or back-projections each of which utilizes a magnification factor which depends on the angle of orientation of an acquisition apparatus in the position giving rise to the rectified data.

19. The method according to claim 7 comprising using projections or back-projections between rectified data and the reconstructed object, projections or back-projections each of which utilizes a magnification factor which depends on the angle of orientation of an acquisition apparatus in the position giving rise to the rectified data.

20. The method according to claim 8 comprising using projections or back-projections between rectified data and the reconstructed object, projections or back-projections each of which utilizes a magnification factor which depends on the angle of orientation of an acquisition apparatus in the position giving rise to the rectified data.

21. The method according to claim 9 comprising using projections or back-projections between rectified data and the reconstructed object, projections or back-projections each of which utilizes a magnification factor which depends on the angle of orientation of an acquisition apparatus in the position giving rise to the rectified data.

22. The method according to claim 10 comprising using projections or back-projections between rectified data and the reconstructed object, projections or back-projections each of which utilizes a magnification factor which depends on the angle of orientation of an acquisition apparatus in the position giving rise to the rectified data.

23. The method according to claim 11 comprising using projections or back-projections between rectified data and the reconstructed object, projections or back-projections each of which utilizes a magnification factor which depends on the angle of orientation of an acquisition apparatus in the position giving rise to the rectified data.

24. The method according to claim 12 comprising using projections or back-projections between rectified data and the reconstructed object, projections or back-projections each of which utilizes a magnification factor which depends on the angle of orientation of an acquisition apparatus in the position giving rise to the rectified data.

25. The method according to claim 1 comprising using several rectification supports that take up different positions as a function of the position of an acquisition apparatus.

26. The method according to claim 25 wherein the rectification support(s) are each made up of two semi-supports having a common direction and each extending from one end of a sensitive zone of the acquisition apparatus.

27. The method according to claim 1 comprising:
producing two types of rectifications corresponding to supports having different directions; and
opting for a rectification support having a first orientation or a rectification support having a second orientation as a function of the orientation of the acquisition apparatus.

28. The method according to claim 1 wherein an acquisition apparatus exhibits a sensitive zone extending according to a single dimension.

29. The method according to claim 2 wherein an acquisition apparatus exhibits a sensitive zone extending according to a single dimension.

30. The method according to claim 3 wherein an acquisition apparatus exhibits a sensitive zone extending according to a single dimension.

31. The method according to claim 4 wherein an acquisition apparatus exhibits a sensitive zone extending according to a single dimension.

32. The method according to claim 5 wherein an acquisition apparatus exhibits a sensitive zone extending according to a single dimension.

33. The method according to claim 6 wherein an acquisition apparatus exhibits a sensitive zone extending according to a single dimension.

34. The method according to claim 7 wherein an acquisition apparatus exhibits a sensitive zone extending according to a single dimension.

35. The method according to claim 8 wherein an acquisition apparatus exhibits a sensitive zone extending according to a single dimension.

36. The method according to claim 9 wherein an acquisition apparatus exhibits a sensitive zone extending according to a single dimension.

37. The method according to claim 10 wherein an acquisition apparatus exhibits a sensitive zone extending according to a single dimension.

38. The method according to claim 11 wherein an acquisition apparatus exhibits a sensitive zone extending according to a single dimension.

39. The method according to claim 12 wherein an acquisition apparatus exhibits a sensitive zone extending according to a single dimension.

40. The method according to claim 13 wherein an acquisition apparatus exhibits a sensitive zone extending according to a single dimension.

41. The method according to claim 25 wherein an acquisition apparatus exhibits a sensitive zone extending according to a single dimension.

42. The method according to claim 26 wherein an acquisition apparatus exhibits a sensitive zone extending according to a single dimension.

43. The method according to claim 27 wherein an acquisition apparatus exhibits a sensitive zone extending according to a single dimension.

44. The method according to claim 1 wherein an acquisition apparatus exhibits a sensitive zone extending according to two dimensions.

45. The method according to claim 2 wherein an acquisition apparatus exhibits a sensitive zone extending according to two dimensions.

46. The method according to claim 3 wherein an acquisition apparatus exhibits a sensitive zone extending according to two dimensions.

47. The method according to claim 4 wherein an acquisition apparatus exhibits a sensitive zone extending according to two dimensions.

48. The method according to claim 5 wherein an acquisition apparatus exhibits a sensitive zone extending according to two dimensions.

49. The method according to claim 6 wherein an acquisition apparatus exhibits a sensitive zone extending according to two dimensions.

50. The method according to claim 7 wherein an acquisition apparatus exhibits a sensitive zone extending according to two dimensions.

51. The method according to claim 8 wherein an acquisition apparatus exhibits a sensitive zone extending according to two dimensions.

52. The method according to claim 9 wherein an acquisition apparatus exhibits a sensitive zone extending according to two dimensions.

53. The method according to claim 10 wherein an acquisition apparatus exhibits a sensitive zone extending according to two dimensions.

54. The method according to claim 11 wherein an acquisition apparatus exhibits a sensitive zone extending according to two dimensions.

55. The method according to claim 12 wherein an acquisition apparatus exhibits a sensitive zone extending according to two dimensions.

56. The method according to claim 13 wherein an acquisition apparatus exhibits a sensitive zone extending according to two dimensions.

57. The method according to claim 25 wherein an acquisition apparatus exhibits a sensitive zone extending according to two dimensions.

58. The method according to claim 26 wherein an acquisition apparatus exhibits a sensitive zone extending according to two dimensions.

59. The method according to claim 27 wherein an acquisition apparatus exhibits a sensitive zone extending according to two dimensions.

60. The method according to claim 28 wherein an acquisition apparatus exhibits a sensitive zone extending according to two dimensions.

61. The method according to claim 1 wherein the geometry of acquisition of the projection data is fan-beam.

62. The method according to claim 1 wherein the geometry of acquisition of the projection data is parallel-beam.

63. The method according to claim 1 wherein the geometry of acquisition of the projection data is cone-beam.

64. The method according to claim 1 wherein the reconstruction is a succession of magnifications, translations and summation of vectors.

65. A method of operating a data processing system comprising:
    acquiring a set of projections acquired for different positions of projection source that is situated a finite distance;
    undertaking a set of rectifications of the projections, the rectifications comprising transforming data of the acquired projections into projection data on a virtual rectification support placed in a preset orientation in concordance with a set of reconstruction calculation points distributed over an image to be reconstructed; and
    reconstructing the image from the rectified set of projections.

66. A computer apparatus comprising means for carrying out the steps of claim 1.

67. A computer readable medium encoded with program code to carry out the steps of claim 1.

68. A computer readable medium encoded with program code that when executed on a computer carry out the step of claim 1.

69. A hardware configuration or circuit arrangement for operating an apparatus for acquiring an image of an object comprising:
    means for causing the apparatus to acquire projections for different positions of the means relative to the object:
    means for providing a source generating the projections to be placed at a finite distance from the means for acquiring projections; and
    means for processing data for determining a value of the reconstructed image in a series of points distributed on the image, the means for processing produces a set of rectifications of acquired projections, each rectification comprising transforming the data of the acquired projection into projection data on virtual rectification support, the rectification support positioned according to a preset orientation in concordance with the distribution of the points for calculation of the image value.

70. An imaging apparatus for reconstruction of an image of an object, comprising;

means for acquiring projections for different positions of the means relative to the object;

means for providing a source generating the projections, means for providing a source being placed at a finite distance from the means for acquiring projections; and means for processing data for determining a value of the reconstructed image in a series of points distributed on the image, the means for processing produces a set of rectifications of acquired projections, each rectification comprising transforming the data of the acquired projection into projection data on virtual rectification support, the rectification support positioned according to a preset orientation in concordance with the distribution of the points for calculation of the image value.

* * * * *